United States Patent
Brooks et al.

(10) Patent No.: US 12,458,129 B2
(45) Date of Patent: Nov. 4, 2025

(54) INTELLIGENT PROVISIONING OF CELL/SECTOR COVERAGE TO OPTIMIZE BROADCAST AREAS FOR WIRELESS EMERGENCY ALERTS

(71) Applicant: T-Mobile USA, Inc., Bellevue, WA (US)

(72) Inventors: Terri L. Brooks, Prosper, TX (US); Timothy N. Dunn, Issaquah, WA (US); John W. Davis, Kansas City, MO (US); Larany D. Ponxay, Garden Grove, CA (US); John Michael Hicks, Olympia, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 281 days.

(21) Appl. No.: 17/526,754

(22) Filed: Nov. 15, 2021

(65) Prior Publication Data
US 2022/0078582 A1    Mar. 10, 2022

Related U.S. Application Data

(60) Provisional application No. 63/135,295, filed on Jan. 8, 2021.

(51) Int. Cl.
*A45D 40/24* (2006.01)
*A45D 34/04* (2006.01)
(Continued)

(52) U.S. Cl.
CPC ............. *A45D 40/24* (2013.01); *A45D 34/04* (2013.01); *A61M 35/003* (2013.01);
(Continued)

(58) Field of Classification Search
CPC ......... H04W 4/90; H04W 4/06; H04W 4/021; H04W 4/02; H04W 76/50; H04W 4/029;
(Continued)

(56) References Cited

U.S. PATENT DOCUMENTS

8,849,235 B1 * 9/2014 Wilson .................... H04W 4/90
455/503
2009/0291630 A1 * 11/2009 Dunn .................... H04L 12/189
455/404.1
(Continued)

*Primary Examiner* — Golam Sorowar
(74) *Attorney, Agent, or Firm* — Lee & Hayes, P.C.

(57) ABSTRACT

Systems and methods are discussed herein for an optimal approach for wireless emergency alerting within cells of wireless communication networks by using a careful estimation of a "true effective radius" of each cell/sector to eliminate broadcasts falling short of alert area boundaries (with users in such gaps in coverage not receiving an alert despite being in the designated alert area). By utilizing true provisioning information of each cell/sector that is at least partly within the alert area boundaries to understand the true effective radii of particular cell sectors can be selected for broadcast of the alert such that the entire alert area is covered for broadcasting of the alert without excessive over-broadcasting, e.g., broadcasting excessively beyond the alert area boundaries. Alerts can then be broadcast within each selected cell sector.

15 Claims, 6 Drawing Sheets

(51) Int. Cl.
*A61M 35/00* (2006.01)
*B65D 83/76* (2025.01)
*H04W 4/06* (2009.01)

(52) U.S. Cl.
CPC .............. *B65D 83/76* (2025.01); *H04W 4/06* (2013.01); *A45D 2200/058* (2013.01)

(58) Field of Classification Search
CPC ......... H04W 4/12; H04W 4/40; H04W 64/00; H04W 4/50; H04W 4/14; H04W 4/08; H04W 4/023; H04W 4/80; H04W 4/70; H04W 84/042; H04W 84/12; H04W 84/18; H04W 4/44; H04W 76/40; H04W 8/005; H04W 12/088; H04W 48/02; H04W 48/04; H04W 48/08; H04W 8/22; H04W 52/0229; H04W 68/005; H04W 4/025; H04W 4/027; H04W 48/18; H04W 64/003; H04W 4/024; H04W 12/06; H04W 24/02; H04W 4/46; H04W 76/11
See application file for complete search history.

(56) References Cited

U.S. PATENT DOCUMENTS

| | | | | |
|---|---|---|---|---|
| 2013/0344840 | A1* | 12/2013 | Titus | ................ H04W 4/90 |
| | | | | 455/404.1 |
| 2014/0273911 | A1* | 9/2014 | Dunn | ................ H04L 65/1073 |
| | | | | 455/404.1 |
| 2018/0302744 | A1* | 10/2018 | Raj | ................ H04W 4/12 |
| 2019/0246260 | A1* | 8/2019 | Edge | ................ H04H 60/51 |

* cited by examiner

INTELLIGENT PROVISIONING OF CELL/SECTOR COVERAGE TO OPTIMIZE BROADCAST AREAS FOR WIRELESS EMERGENCY ALERTS

PRIORITY CLAIM AND CROSS-REFERENCE TO RELATED APPLICATIONS

This Application is a non-provisional of, and claims priority under 35 USC § 119(e), to U.S. Provisional Patent Application No. 63/135,295, filed Jan. 8, 2021, which is fully incorporated by reference herein as if fully set forth below.

BACKGROUND

Wireless Emergency Alerts (WEAs) carry potentially life-saving information, often of a time-critical nature. Alert Originators (AOs) designate an area for dissemination of the alert ("alert area"), within which they determine the WEA message ("alert") information as being valuable to the extent that it may affect the decisions, actions, and safety of the WEA recipients. The knowledge and experience of the AOs work in conjunction with the Commercial Mobile Service Provider's (CMSP's) WEA and network infrastructure broadcast systems in an effort to have the alert reach as many users as possible who may be impacted by the event(s) or situation which triggered the alert.

CMSP cell site/sector boundaries are designed with the purpose of ensuring cellular coverage that accommodates, among other factors, the local population density, challenging conditions (dense urban) and terrain (mountains, valleys, and other obstacles), and may not allow for the selection of a group of cell/sectors which may match the boundaries of the designated target area for an alert (alert area). As used herein, cell also refers to cell site or cellsite. This mismatch of boundaries may result in either having the WEA broadcast not reach all parts of the target area ("undershoot"), reach beyond the target area ("overshoot"), or a combination of both. The degree of impact may be related to the extent of the mismatch.

The mismatch between the cell/sector broadcast boundaries and the alert area boundaries may result in both overshoot and undershoot in the field, meaning that mobile devices inside the alert area may not receive the broadcast (undershoot) and mobile devices outside the alert area may receive the broadcast (overshoot). When boundaries do not match, there is a choice between only using cell/sector selection coverage inside the alert area boundaries, or using cell sector selection that crosses those boundaries, broadcasting outside the alert area. If the broadcast coverage crosses the boundaries, mobile devices outside the alert area may receive and present the alert. If the broadcast coverage falls short of the alert area boundaries in an effort to avoid crossing them, mobile devices inside the alert area, between the edge of the broadcast and the alert area boundary, may not present the alert because they may not receive the broadcast.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques and architecture are described herein for an optimal approach for wireless emergency alerting within cells of wireless communication networks by using a careful estimation of a "true effective radius" of each cell/sector to eliminate broadcasts falling short of alert area boundaries (with users in such gaps in coverage not receiving an alert despite being in the designated alert area). By utilizing true provisioning information of each cell/sector that is at least partly within the alert area boundaries to understand the true effective radii of particular cell/sectors can be selected for broadcast of the alert such that all mobile devices in the entire alert area are covered for broadcasting of the alert without excessive over-broadcasting, e.g., broadcasting excessively beyond the alert area boundaries. Alerts can then be broadcast within each selected cell/sector.

Wireless Emergency Alerts (WEAs) carry potentially life-saving information, often of a time-critical nature. Alert Originators (AOs) designate an area for dissemination of the alert, within which they determine the WEA message ("alert") information as being valuable to the extent that it may affect the decisions, actions, and safety of the WEA recipients. The knowledge and experience of the Alert Originators work in conjunction with the Commercial Mobile Service Provider's (CMSP) WEA and network infrastructure broadcast systems in an effort to have the alert reach as many users as possible who may be impacted by the event(s) or situation which triggered the alert.

CMSP cell site/sector boundaries are designed with the purpose of ensuring cellular coverage that accommodates, among other factors, the local population density, challenging conditions (dense urban) and terrain (mountains, valleys, and other obstacles), and may not allow for the selection of a group of cell/sectors which may match the boundaries of the designated alert area for an alert. This mismatch of boundaries may result in either having the WEA broadcast not reach all parts of the alert area ("undershoot"), reach beyond the alert area ("overshoot"), or a combination of both. The degree of impact may be related to the extent of the mismatch.

There are many factors stemming from both technological and human sources, that impact the definition of the alert area, and the user's perception for an alert. The alert area specified by the alert originator based on the current knowledge of the alert event, together with possible extrapolation (e.g., expansion for expected immediate weather path), may itself sometimes be imperfect from the perspective of individual recipients. From this alert area, the broadcast area is built. Due to the physics of radio propagation and the factors involved in network coverage planning as mentioned above, the cell/sector selection that comprises the resulting broadcast area will not be directly matched to the alert area.

Each CMSP has the sole responsibility for cell/sector selection for WEA on their network, which is dependent on the network topology and other parameters within their network. User impacts from cell/sector selection resulting in the broadcast extending beyond the alert area boundaries may be mitigated by mobile devices capable of WEA 3.0 (provided by the Federal Communications Commission (FCC) as these mobile devices may compare their location to the alert area prior to presenting an alert. The market penetration of WEA 3.0 capable mobile devices is growing. However, significant market penetration may take some time. In addition, WEA 3.0 capable mobile devices may be limited to improving alert delivery targeting only when the alert originator includes polygons and/or circles in the alert message. If only geocodes are included in the alert message, or when pre-WEA 3.0 mobile devices receive the alert, device-based geo-fencing (DBGF) will not be performed.

Cell/sector selection results may differ by CMSP due to variations in network deployment, the cell/sector selection approach, and the effective radius supplied by the CMSP for use in the cell site/sector selection process. A CMSP's cell site/sector selection technique, as well as the data that drives the selection of the cell/sectors for broadcasting WEAs, are evaluated based on specific CMSP network configurations and attempt to account for both the technical and policy considerations.

The alert originator, as well as the CMSP side of the WEA system, should be designed to provide the best possible build of the broadcast area to support messaging to the alert recipients. Crafting the alert text in order to communicate the exact nature and location of the imminent threat assists the alert recipient (mobile device user) by allowing the alert recipient to gauge his or her proximity and plan accordingly. Having the alert reach the correct recipients is a critical step resulting in the combination of the assessment by the alert originator of the alert area and the delivery by the CMSP to that alert area. This is important for alert originators to understand when choosing the geo-targeting related parameters for a given alert.

There is a tension between "false positive" (referred to above as "overshoot") errors, in which an alert is delivered to mobile device users outside the intended alert area, and "false negative" errors (referred to above as "undershoot"), in which an alert is not delivered to some mobile device users in the alert area. While having the alert broadcast reach all mobile devices within the intended alert area is the objective, it is not technically feasible to guarantee a broadcast accomplishing 100% broadcast coverage of the alert area without also broadcasting beyond, due to the complexity and physical characteristics of wireless propagation in the real world. The portion of the broadcast extending beyond the alert area will result in false positive errors.

Prior to WEA 3.0, there was only one process within the CMSP network to affect the presentation of an alert on a mobile device based on its location. This is the process of Network-Based Geo-Targeting (NBGT), which is cell/sector selection for the broadcast with the idea of a "best approximation" attempting to match the broadcast as closely as possible to the alert area, with the premise that this cannot be exact as the cell/sector coverage boundaries do not match the alert area boundaries. Any mobile device receiving the alert would then present the alert.

As previously noted, the mismatch between the cell/sector broadcast boundaries and the alert area boundaries may result in both overshoot and undershoot in the field, meaning that mobile devices inside the alert area may not receive the broadcast (undershoot) and mobile devices outside the alert area may receive the broadcast (overshoot). When boundaries do not match, there is a choice between only using cell/sector selection coverage inside the alert area boundaries or using cell/sector selection that crosses those boundaries, thereby broadcasting the alert outside the alert area (overshoot). If the broadcast coverage crosses the boundaries, mobile devices outside the alert area may receive and present the alert. If the broadcast of the alert falls short of the alert area boundaries in an effort to avoid crossing them, mobile devices inside the alert area, between the edge of the broadcast boundary and the alert area boundary, may not present the alert because the mobile devices may not receive the alert broadcast.

One approach is to select cell/sectors in an attempt to fully cover the alert area, which may result in having the alert broadcast extend beyond some boundaries of the alert area, then have an added capability in the mobile device that "trims" the alert presentation back down to those mobile devices within, or very close to, the alert area boundaries. This is a process in accordance with WEA 3.0 and is referred to as DBGF.

In particular, when an alert received by a CMSP includes an alert area defined by coordinates (e.g., a polygon or circle), the network supports DBGF by conveying the coordinates to the mobile devices as part of the broadcast alert. If a mobile device is WEA 3.0 capable, it can recognize the inclusion of the coordinates as direction from the network to perform DBGF and can process those coordinates and use them in the decision-making process of whether to present the alert. If the mobile device is inside the alert area, the alert may be presented. If the mobile device is outside of the alert area, the alert may not be presented.

When used in conjunction, NBGT may select cell/sectors that comprise a total broadcast area with the intent to ensure that the broadcast may reach all mobile devices in the alert area with no uncovered gaps, if possible, while at the same time depending on the DBGF in the WEA 3.0 capable mobile devices to only present the alert if the mobile device location is within that alert area at the time the alert is broadcast.

WEA 3.0 relies on this coordination between NGBT and DBGF. If a mobile device receiving an alert that includes coordinates is not capable of performing DBGF, the mobile device may ignore the coordinates and present the alert. In places where the broadcast area reaches beyond the alert area, mobile devices not capable of performing DBGF will still present the alert.

In addition, there are scenarios in which a WEA 3.0 capable mobile device may not be able to perform DBGF. For example, the user may have location services turned off for any number of reasons, possibly including privacy or the intent to save battery power. If a mobile device has location services turned off, or if for any other reason is unable to obtain a current location to be used for performing DBGF when an alert is received, the mobile device will default to presenting the alert.

Generally, two types of broadcast coverage are used for alert dissemination. These two types of broadcast coverage are referred to as (i) best approximation and (ii) 100% coverage. While the selection algorithm may be the same, the "provisioned" data will drive different results.

When an alert is received, the CMSP uses the associated defined alert area to perform cell/sector selection. This is the process of selecting the specific cell sites/sectors that comprise the total area over which the alert may be broadcast. The results of a selection algorithm, which may be executed by a Baseboard Management Controller (BMC), may vary due to something referred to as provisioning of the cell/sector information. This means placing cell/sector equipment location information and the associated effective broadcast radius of that equipment in a database accessible by the selection algorithm. This combination of location and radius information provides what is referred to as the coverage (i.e., physical area covered by the broadcast) for that cell/sector.

The cell/sector selection algorithm checks for any overlap between the coverage of each cell/sector and the defined alert area. The results may then be driven by the method of provisioning of the radius information. For example, provisioning the estimated radius of the cell/sector equipment should result in having the algorithm select every cell/sector with any degree of overlap of the alert area. In contrast, provisioning a very small radius, such as one meter, would result in a cell/sector selection of only the cell/sector equipment inside the alert area. Another option may be to scale the radius to something in between these two examples. Scaling the radius down may result in a decrease of overshoot. However, this would risk creating effective undershoot due to uncertainty as to whether a mobile device located inside the alert area is receiving the broadcast from a cell/sector excluded from the broadcast. As described further herein, cell/sector selection, driven by operator policy and steered through provisioning, may result in overshoot, undershoot, or both.

Figure 1A:
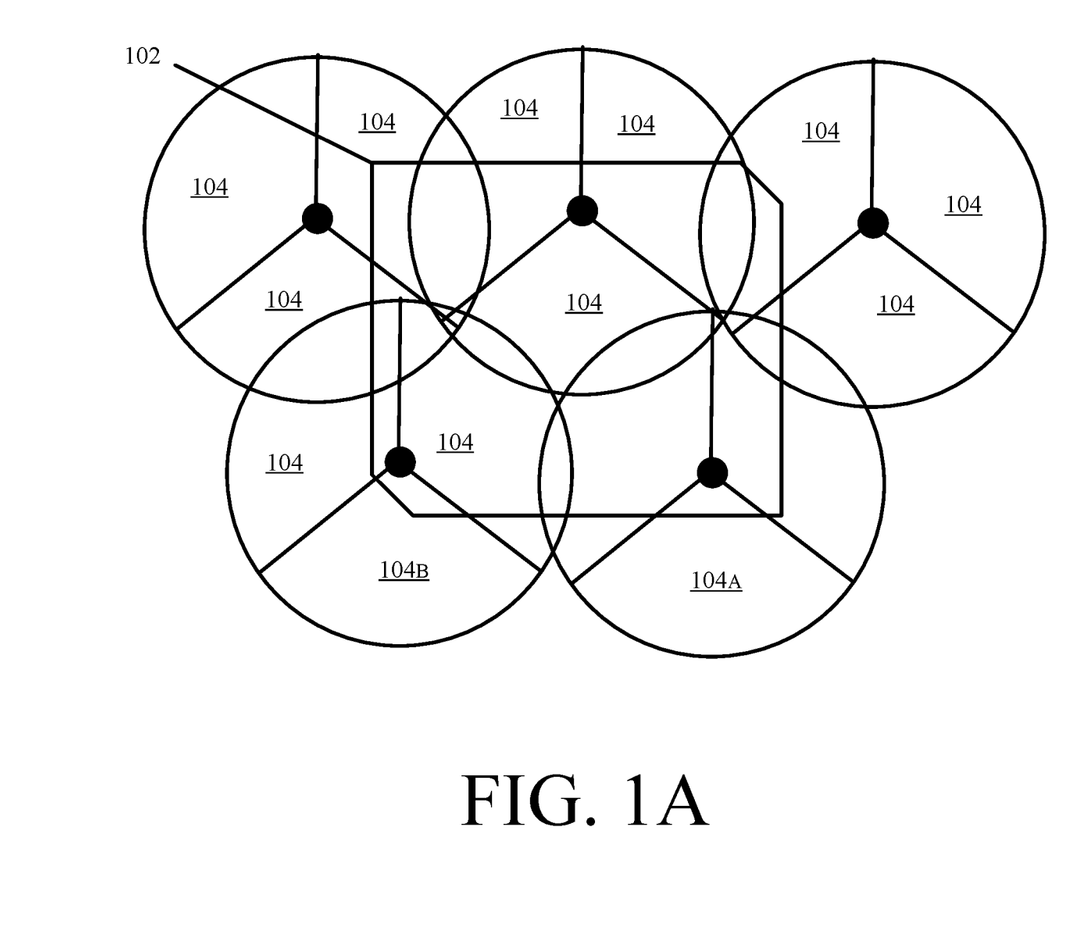
FIGS. 1A and 1B schematically illustrate the same alert area polygon with an overlay of small cells comprising cell sectors (FIG. 1A) and an overlay of larger cells comprising cell/sectors (FIG. 1B), in accordance with various configurations.
Figure 1B:
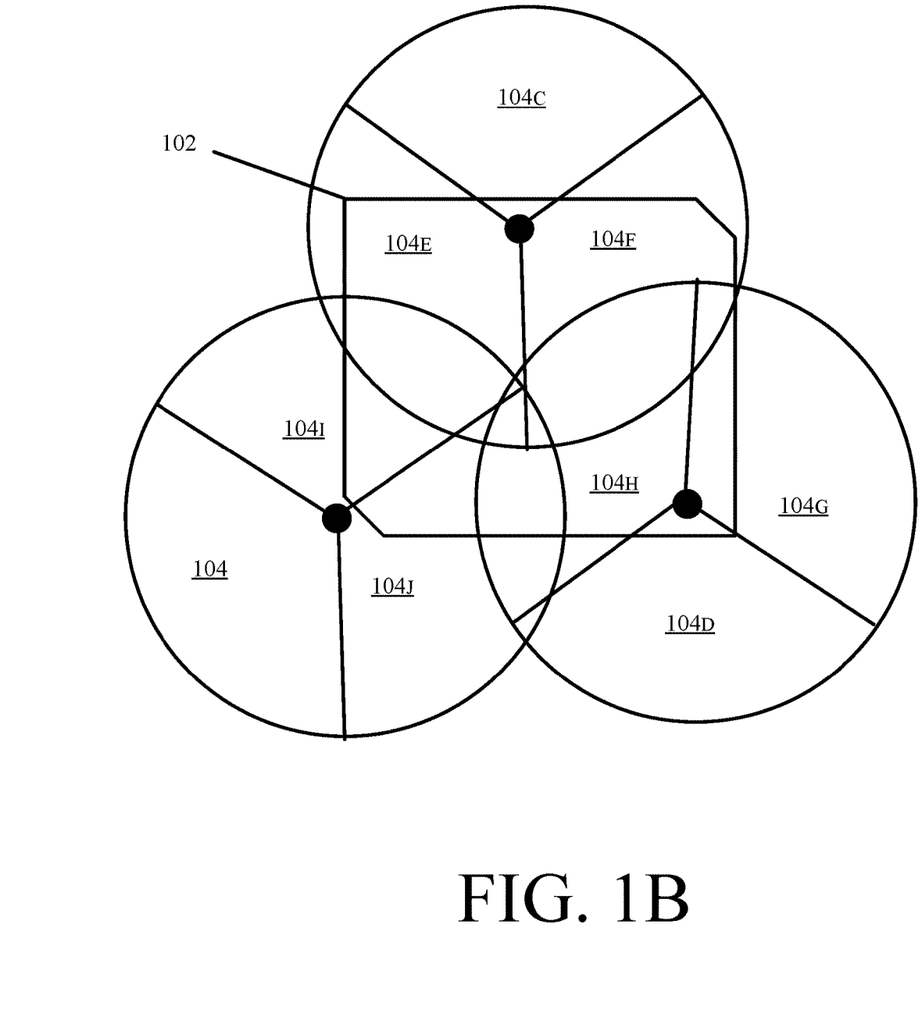

Another critical factor that influences the degree of overshoot is the cell/sector size. A comparison is illustrated with two figures using the same alert area 102 polygon with an overlay of small cells comprising cell sectors 104 (FIG. 1A) and an overlay of larger cells comprising cell sectors 104 (FIG. 1B). The same scale is assumed in both figures. In FIG. 1A with the small cell overlay, cell sectors 104a and 104b may be selected as part of the broadcast area for the alert and may cause overshoot (e.g., broadcast of the alert outside the alert area polygon 102), but these cell sectors 104a, 104b may not produce the depth or breadth of overshoot that may occur in larger cells. In comparison, using FIG. 1B, cell sectors 104c and 104d may be selected as part of the broadcast area for the alert. Each may produce a large total overshoot area, as well as a greater degree (depth) of overshoot, as compared to the smaller cells illustrated in FIG. 1A.

Depending on network operator policy and provisioning, the cell/sector selection for best approximation may equal the cell/sector selection for 100% coverage. FIG. 1B is used below to illustrate the cell/sector selection techniques.

In a best approximation selection technique, the cells or sectors 104 may be selected to build a broadcast area that approximates the alert area 102. The use of additional decision-making factors may apply. The provisioning of the cell/sector information may steer the results.

A CMSP may choose to perform best approximation selection that attempts to minimize overshoot by selecting only cell site equipment inside the alert area 102. In this case, the selection in FIG. 1B would include cell sectors 104c, 104e, 104f, 104g, 104h, and 104d in the broadcast of the alert. For each of these choices, the cell site equipment falls inside the alert area 102 polygon. The provisioning that steers toward this result may involve using a very small radius number, just large enough to produce a positive overlap result during the comparison process. Another option is to perform cell selection covering the full alert area, attempting to eliminate undershoot. In this case, the selection in FIG. 1B would include 104c, 104e, 104f, 104g, 104h, 104d, 104i, and 104j. This represents a variation of best approximation equivalent to 100% coverage. The provisioning that steers toward this result involves using the estimated radius of the cell/sector equipment. The best approximation technique does not impose specific restrictions. This is a list of example variations, and is not meant to be exhaustive in representing all options.

The best approximation technique allows for the possibilities of overshoot and undershoot. Where undershoot occurs, mobile devices inside the alert area 102 may not receive the alert broadcast. Overshoot may result in presentation of the alert by mobile devices outside the alert area 102. Due to the number of mobile devices currently in the field that are not capable of DBGF, a significant percentage of mobile devices receiving the WEA from the overshoot portion of the broadcast may present the alert. WEA 3.0 capable mobile devices may have the capability to perform DBGF, not presenting the alert if outside the alert area 102.

In a 100% coverage selection technique, the cells or sectors may be selected in such a way that, to the extent technically possible, no portion of the alert area may be left uncovered by the alert broadcast, and all mobile devices inside the alert area will be receiving their broadcast from a cell site/sector that is broadcasting the alert. Due to challenging terrain and other factors, this may not always be possible. As the cell or cell sector 104 boundaries may not exactly match the alert area 102 boundaries, the 100% coverage selection technique may result in having the alert broadcast overshoot some or all boundaries of the alert area 102. The 100% coverage selection technique may work best when used in conjunction with the DBGF capability in the mobile device to mitigate the overshoot. Using the 100% coverage selection technique, cell/sectors 104c, 104e, 104f, 104g, 104h, 104d, 104i, and 104j in FIG. 1B may be included in the alert broadcast. The selection of cell sector 104c may produce extreme overshoot of the broadcast, but not selecting this cell sector may result in mobile devices inside the alert area 102 not receiving the alert.

In this example, overshoot may result in presentation of the alert by mobile devices outside the alert area 102 due to the number of mobile devices in the field that are not capable of DBGF. WEA 3.0 capable mobile devices may have the capability to perform DBGF, not presenting the alert if outside the alert area 102.

In configurations, a CMSP may determine which of its network facilities, elements, and locations may be used to geographically target alert messages. A CMSP may deliver any alert message that is specified by a circular shaped or polygon shaped alert area 102 to an area that matches the specified circle or polygon. A CMSP is considered to have matched the target alert area 102 when the CMSP delivers an alert message to 100 percent of the target alert area 102 with no more than 0.1 of a mile overshoot. If some or all of a CMSP's network infrastructure is technically incapable of matching the specified alert area 102, then that CMSP may deliver the alert message to an area that best approximates the specified alert area on and only on those aspects of its network infrastructure that are incapable of matching the alert area 102. A CMSP's network infrastructure may be considered technically incapable of matching the alert area 102 in limited circumstances, including when the alert area 102 is outside of the CMSP's network coverage area, when mobile devices have location services disabled, and when legacy networks or mobile devices may not be updated to support this functionality.

Thus, currently CMSPs either utilize the best approximation cell sector selection technique or the 100% coverage selection technique. For the best approximation selection technique, the CMSPs generally provision the cells or cell sectors 104 as having a minimal broadcast radius or coverage area, e.g., 1 meter, as opposed to a substantially accurate broadcast radius or coverage area. The best approximation selection technique selects only base stations located within the alert area 102, which may result in undershoot and/or overshoot. In other words, instead of using true effective radius on a per cell/sector basis, the CMSPs using the best approximation coverage selection technique may provision cell/sectors using a single representation equivalent to the smallest cell radius, or at least a small or minimal cell radius.

For the 100% coverage selection technique, currently the CMSPs generally select all cell sectors 104 that broadcast into any portion of the alert area 102. This results in 100% coverage of the alert area but also results in a tremendous amount of overshoot. For the 100% coverage selection technique, the CMSPs also generally do not provision the cells or cell sectors 104 with a substantially accurate broadcast radius or coverage area but rather provision all cells or cell sectors 104 with the largest broadcast radius possible for all cells or cell sectors 104. In other words, instead of using true effective radius on a per cell/sector basis, the CMSPs currently using the 100% coverage selection technique provision cell/sectors may use a single representation equivalent to the largest cell radius.

In configurations herein, a substantially accurate broadcast coverage area of each cell sector 104 (and/or each entire cell) is provisioned. When an alert for broadcast into the alert area 102 is received, based at least in part on provisioned broadcast coverage areas of the cell sectors 104, a group of cell sectors for broadcasting the alert such that the alert is broadcast over the entire alert area 102 is selected. However, the group of selected cell sectors 104 does not include every cell sector 104 that broadcasts within at least a portion of the alert area 102. The group of selected cell sectors 104 then broadcasts the alert. Thus, the selected group of cell sectors 104 broadcasts the alert to substantially all of the alert area 102 with minimal overlap and overshoot.

Figure 2:
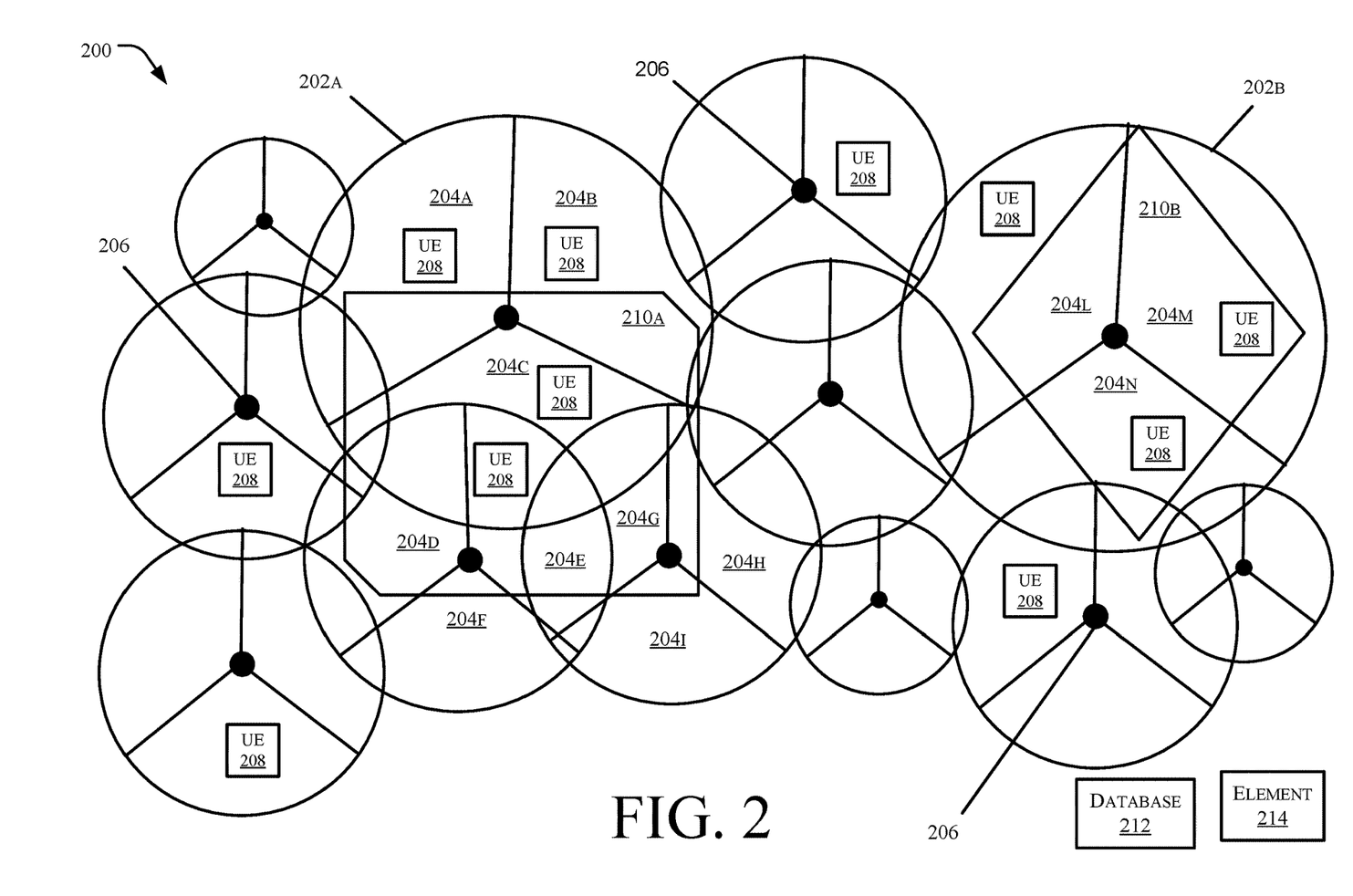
FIG. 2 schematically illustrates a portion of an example wireless communication network indicating selected cell/sectors for broadcasting an alert over and within alert areas, in accordance with various configurations.

FIG. 2 schematically illustrates a portion of a wireless communication network 200 that includes various components. The wireless communication network 200 includes multiple broadcast cells 202 that are divided into a plurality of cell sectors 204, e.g., cell sectors 104. Each broadcast cell 202 includes a base station 206. The wireless communication network 100 further includes UEs 208, e.g., mobile devices. As is known, there are generally many more components within the wireless communication network 200 that are not illustrated in FIG. 2 for clarity purposes. Examples of such components include, but are not limited to, Home Location Register/Home Subscriber Server (HLR/HSS), Charging System (CS), Policy Enforcement Server (NAP), Short Message Service Server (SMS), Voice Mail Server (VMS), EPOCH, GFLEX, Internet Protocol (IP) Management System (IPM), Caller Tunes (CTUNES), XDMS, MSTORE, Web Services Gateway (WSG), Over the Air (OTA) System, etc.

The wireless communication network 200, the base stations, 206, and the UEs 208 are configured to operate according to one or more operating protocols. Thus, the base stations 206 may include one or more radios and one or more antennas, which may be directional or uni-directional. In configurations, the wireless communication network 200, the base stations 206, and the UEs 208 may be configured to operate according to one or more operating protocols including, but not limited to, Global System for Mobile Communications (GSM), Time Division Multiple Access (TDMA), Universal Mobile Telecommunications System (UMTS), Evolution-Data Optimized (EVDO), 3G, 4G, 5G, Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like. While the broadcast cells 202 are illustrated as having three cell sectors 204, the type of radio and/or antenna, as well as the operating protocol, determine the number of cell sectors 204. Therefore, there may be more than three cell sectors 204 or fewer than three cell sectors 204 within one or more of the broadcast cells 202.

The UEs 208 may be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. In configurations, the UEs 208 may be implemented as an Internet of things (IoT) device (also known as a machine-to-machine (M2M) device) configured to operate within the wireless communication network 100. Although this description predominantly describes the UE 208 as being "mobile" (i.e., configured to be carried and moved around), it is to be appreciated that the UEs 208 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UEs 208 may be capable of communicating over wired networks, and/or wirelessly using any suitable wireless communications/data technology, protocol, or standard, such as those mentioned above. As is known, there are generally numerous UEs 208 operating within the wireless communication network 200.

As can be seen in FIG. 2, an alert area 210*a* and an alert area 210*b* are defined for broadcasting an alert over and/or within the alert area 210*a* and/or 210*b*. A database 212 includes provisioned substantially accurate broadcast coverage areas, e.g., cell sizes, for each cell 202 and thereby, each cell sector 204. The provisioned substantially accurate broadcast coverage areas for each cell sector 204 may be based at least in part on one or more parameters such as, for example, radio type, power of a radio, broadcast radius, azimuth, etc. Additionally, the substantially accurate broadcast coverage areas may be provisioned, e.g., updated, periodically. The periodicity of provisioning may be daily, weekly, monthly, quarterly, yearly, etc.

Upon receiving the alert for broadcasting, a selection algorithm may be executed by an element 214 of the wireless communication network 200 to select which cell sectors 204 (and/or cells 202) may be used to broadcast the alert to UEs 208 within the alert areas 210a and/or 210b. The selection algorithm may obtain the provisioned broadcast coverage areas from the database 212. Thus, in configurations, cell 202a, e.g., cell sectors 204a, 204b and 204c, is selected by the selection algorithm for broadcasting the alert over and within the alert area 210a. Cell sectors 204d, 204e, 204f, 204g, 204h, and 204i are also selected by the selection algorithm for broadcasting the alert over and within the alert area 210a. Cell 202b, e.g., cell sectors 204l, 204m, and 204n, is selected for broadcasting the alert over and within the alert area 210b as cell 202b covers the entire alert area 210b. Thus, the entire alert areas 210a, 210b are covered for broadcasting of the alert.

In configurations, the alert may be broadcast with coordinates corresponding to the alert areas 210a and/or 210b. Thus, if any of the UEs 208 are WEA 3.0 capable, such UEs 208 may perform DBGF and not presenting the alert if located outside the alert areas 210a and/or 210b.

Figure 3:
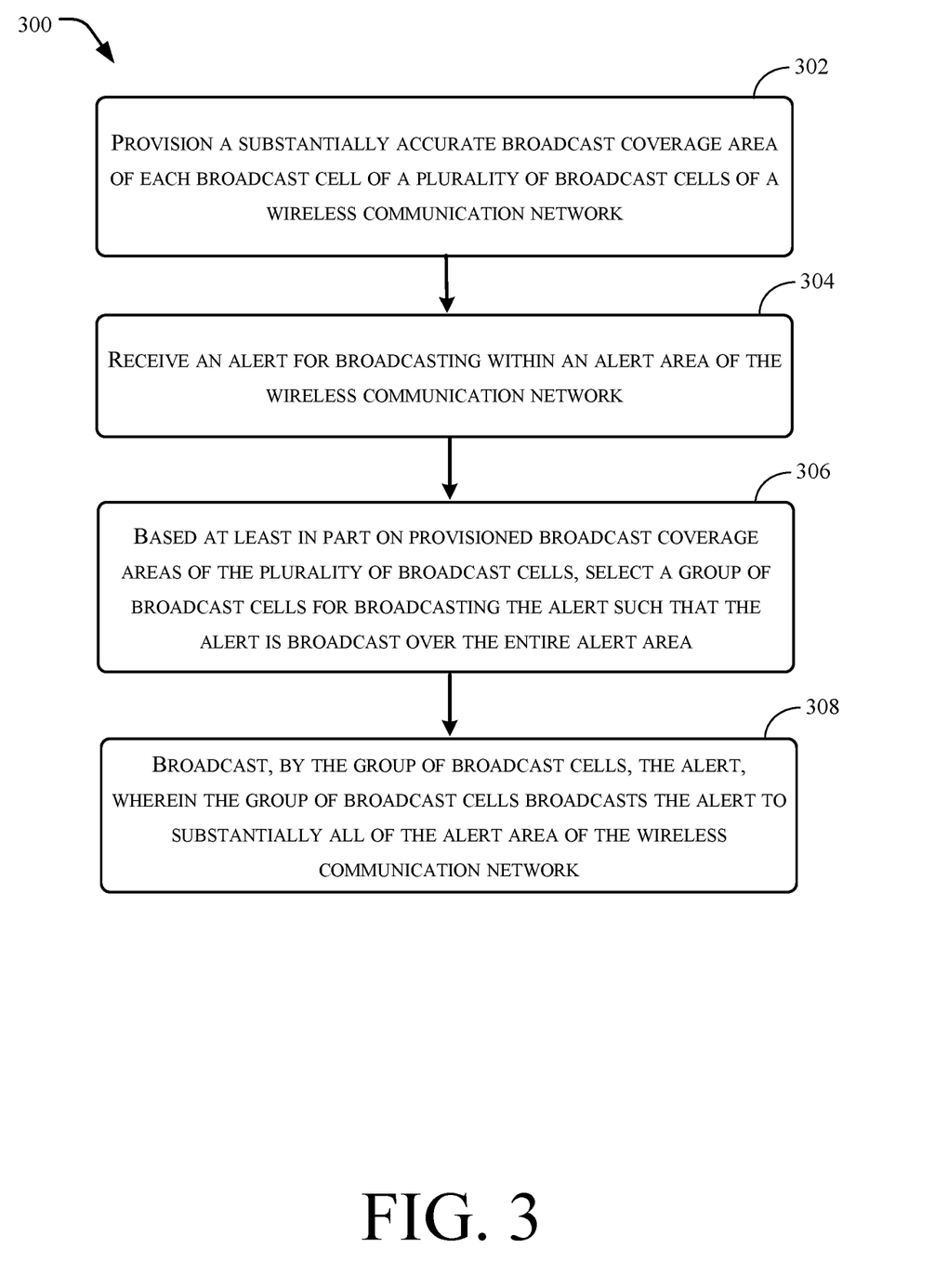
FIG. 3 is a flow diagram of an example process for selecting cells and/or cell/sectors for broadcasting an alert over and within alert areas in the wireless communication network of FIG. 1, in accordance with various configurations.

FIG. 3 is a flow diagram of an illustrative process that may be implemented within or in association with the wireless communication network 200. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 3 is a flow diagram of an example process 300 for selecting a group of broadcast cells for broadcasting an alert such that the alert is broadcast over an entire alert area within a wireless communication network that comprises a plurality of broadcast cells. At block 302, a substantially accurate broadcast coverage area of each broadcast cell of the plurality of broadcast cells is provisioned. At block 304, an alert for broadcasting within an alert area of the wireless communication network is received.

At block 306, based at least in part on provisioned broadcast coverage areas of the plurality of broadcast cells, a group of broadcast cells for broadcasting the alert such that the alert is broadcast over the entire alert area is selected. The group of broadcast cells does not include every broadcast cell that broadcasts within at least a portion of the alert area. At block 308, the group of broadcast cells broadcasts the alert, wherein the group of broadcast cells broadcasts the alert to substantially all of the alert area of the wireless communication network.

While the techniques and architecture described herein have been primarily described with respect to a wireless communication network, those skilled in the art will recognize that the techniques and architecture are equally applicable to other types of networks that utilize application pods and containers to provide services to various devices.

Figure 4:
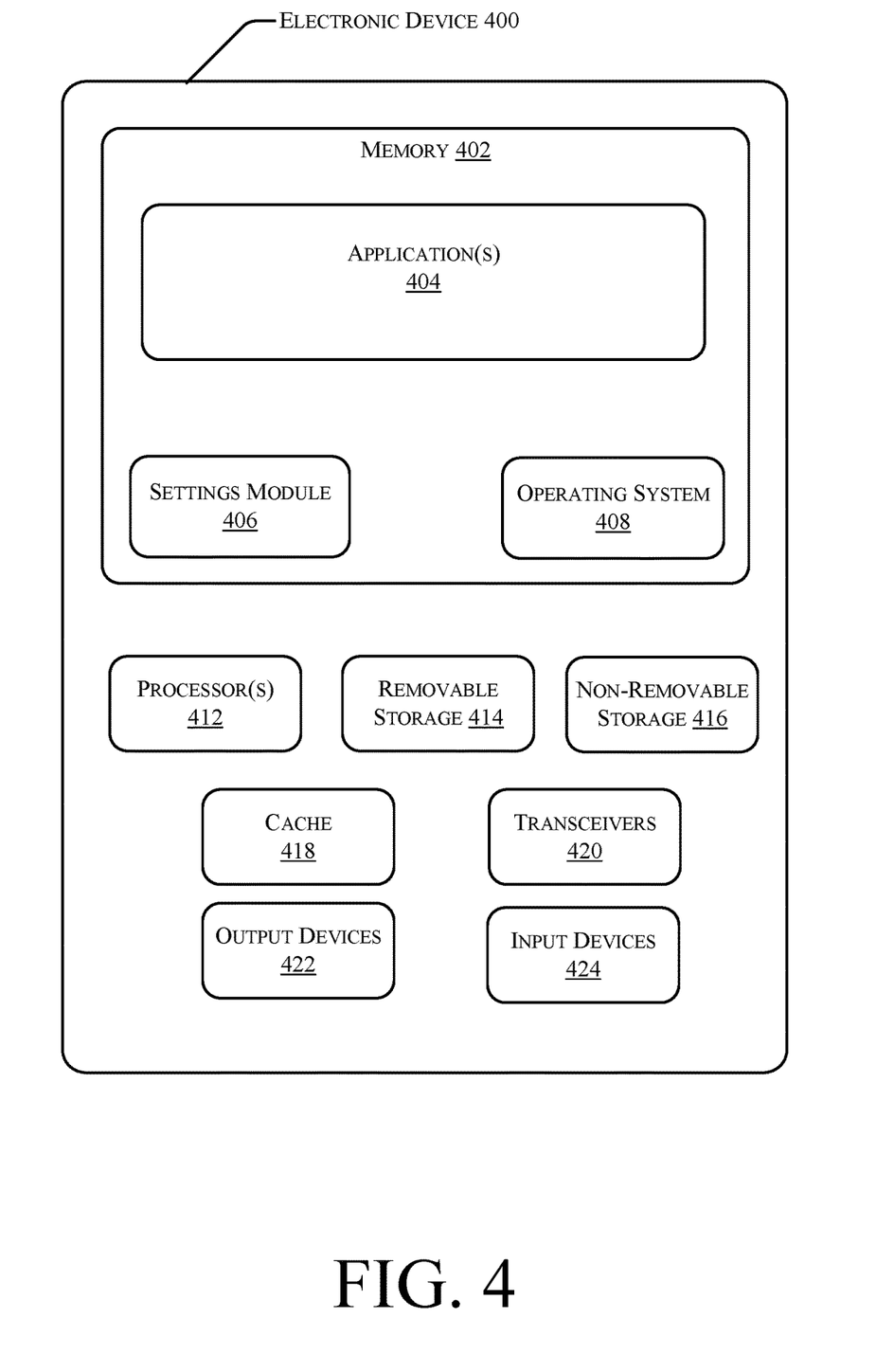
FIG. 4 schematically illustrates a component level view of an example electronic device configured for use in the wireless communication network of FIG. 1, in accordance with various configurations.

FIG. 4 schematically illustrates a component level view of an example electronic device 400, such as UE 208, configured to function within wireless communication network 200. The electronic device 400 may include more or less components depending on the type of electronic device. As illustrated, the electronic device 400 comprises a system memory 402, e.g., computer-readable media, storing application(s) 404. The mobile device also comprises a settings module 406, and an operating system 408. Also, the electronic device 400 includes processor(s) 412, a removable storage 414, a non-removable storage 416, cache 418, transceivers 420, output device(s) 422, and input device(s) 424. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The electronic device 400 may also include additional data storage devices (removable and/or non-removable) such as, for example, magnetic disks, optical disks, or tape. Such additional data storage may include removable storage 414 and non-removable storage 416. Additionally, the electronic device 400 includes cache 418.

Non-transitory computer-readable media may include volatile and nonvolatile, removable and non-removable tangible, physical media implemented in technology for storage of information, such as computer readable instructions, data structures, program modules, or other data. System memory 402, removable storage 414, non-removable storage 416 and cache 418 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 400. Any such non-transitory computer-readable media may be part of the electronic device 400. The processor(s) 412 may be configured to execute instructions, which may be stored in the non-transitory computer-readable media or in other computer-readable media accessible to the processor(s) 412.

In some implementations, the transceivers 420 include any sort of transceivers known in the art. For example, the transceivers 420 may include a radio transceiver that performs the function of transmitting and receiving radio frequency communications via an antenna (not shown). Also, or alternatively, the transceivers 420 may include wireless modem(s) to facilitate wireless connectivity with other computing devices. Further, the transceivers 420 may include wired communication components, such as an Ethernet port, for communicating with other networked devices.

In some implementations, the output devices 422 include any sort of output devices known in the art, such as a display (e.g., a liquid crystal display), speakers, a vibrating mechanism, or a tactile feedback mechanism. Output devices 422 also include ports for one or more peripheral devices, such as headphones, peripheral speakers, or a peripheral display.

In various implementations, input devices 424 include any sort of input devices known in the art. For example, input devices 424 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 424 may be used to enter preferences of a user of the electronic device 400 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 402 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may various perform operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
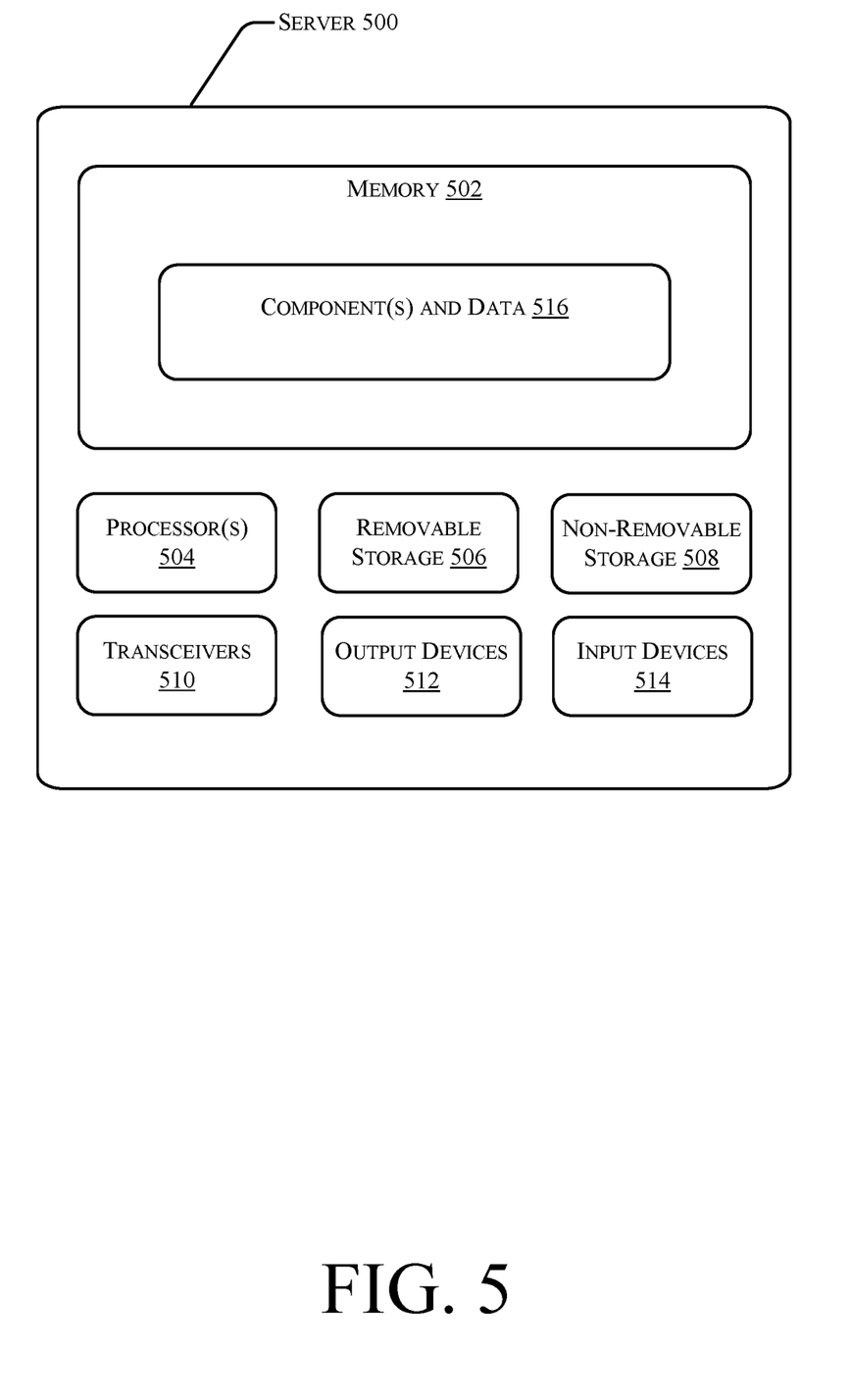
FIG. 5 schematically illustrates a component level view of a server configured for use in the wireless communication network of FIG. 1, in accordance with various configurations.

FIG. 5 illustrates a component level view of a server 500 configured for use within a wireless communication network, e.g., wireless communication network 100, in order to provide various services within the wireless communication network, according to the techniques described herein. For example, one or more servers 500 may be configured to implement database 212 and/or element 214.

As illustrated, the server 500 comprises a system memory 502 that may store one or more components, modules, and/or applications and data 516 for interacting with electronic devices 400, e.g., UEs 110, or other electronic devices that may be configured as connected devices, as described herein. Also, the server 500 may include processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.), or some combination of the two. In some implementations, the processor(s) 504 is a Central Processing Unit (CPU), a Graphics Processing Unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable storage 508 may include module(s) and data 516 (illustrated in the memory 502). The module(s) and data 516 may include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead of, the transceivers 510 may include wireless modem(s) to facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 502 and memory 502 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method within a wireless communication network comprising a plurality of broadcast cells, the method comprising:
    estimating a true effective radius based at least in part on a combination of individual effective radii for each broadcast cell of the plurality of broadcast cells and based at least on a policy of an operator of the wireless communication network;
    based on the estimating, provisioning a database of the wireless communication network with a substantially accurate broadcast coverage area of each broadcast cell of the plurality of broadcast cells based at least in part on a radio type, wherein provisioning the substantially accurate broadcast coverage area of each broadcast cell of the plurality of broadcast cells comprises periodically provisioning the substantially accurate broadcast coverage area of each broadcast cell of the plurality of broadcast cells;
    receiving an alert for broadcasting within an alert area of the wireless communication network, the alert area being within the true effective radius;
    based at least in part on provisioned broadcast coverage areas of the plurality of broadcast cells, selecting a group of broadcast cells for broadcasting the alert such that the alert is broadcast over substantially all of the alert area, wherein the group of broadcast cells does not include every broadcast cell that broadcasts within at least a portion of the alert area; and
    broadcasting, by the group of broadcast cells, the alert, wherein broadcasting, by the group of broadcast cells, the alert comprises broadcasting, by the group of broadcast cells such that only a portion of one or more of the broadcast cells of the group of broadcast cells broadcast the alert, the group of broadcast cells broadcasting the alert to substantially all of the alert area of the wireless communication network.

2. The method of claim 1, wherein broadcasting, by the group of broadcast cells, the alert comprises broadcasting, by the group of broadcast cells such that only a portion of one or more of the broadcast cells of the group of broadcast cells broadcast the alert.

3. The method of claim 2, wherein the one or more of the broadcast cells of the group of broadcast cells comprise one or more directional antennas.

4. The method of claim 2, wherein the portion of the one or more of the broadcast cells of the group of broadcast cells is identified based at least in part on the substantially accurate broadcast coverage area.

5. The method of claim 1, wherein broadcasting, by the group of broadcast cells, the alert comprises broadcasting, by the group of broadcast cells, geographical coordinates of the alert area.

6. The method of claim 1, wherein periodically provisioning a substantially accurate broadcast coverage area of each broadcast cell of the plurality of broadcast cells comprises periodically provisioning a substantially accurate broadcast coverage area of each broadcast cell of the plurality of broadcast cells at least one of daily, weekly, or monthly.

7. The method of claim 1, wherein the substantially accurate broadcast coverage area is provisioned prior to receiving the alert.

8. The method of claim 1, wherein the substantially accurate broadcast coverage area is provisioned prior to determining the alert area.

9. A system comprising:
one or more processors; and
one or more non-transitory computer-readable media storing computer executable instructions that, when executed by the one or more processors, cause the one or more processors to perform actions comprising:
estimating a true effective radius based at least in part on a combination of individual effective radii for each broadcast cell of a plurality of broadcast cells and based at least on a policy of an operator of a wireless communication network;
based on the estimating, provisioning a database of the wireless communication network with a substantially accurate broadcast coverage area of each broadcast cell of the plurality of broadcast cells within the wireless communication network based at least in part on a radio type, wherein provisioning the substantially accurate broadcast coverage area of each broadcast cell of the plurality of broadcast cells comprises periodically provisioning the substantially accurate broadcast coverage area of each broadcast cell of the plurality of broadcast cells;
receiving an alert for broadcasting within an alert area of the wireless communication network, the alert area being within the true effective radius;
based at least in part on provisioned broadcast coverage areas of the plurality of broadcast cells, selecting a group of broadcast cells for broadcasting the alert such that the alert is broadcast over substantially all of the alert area, wherein the group of broadcast cells does not include every broadcast cell that broadcasts within at least a portion of the alert area; and
broadcasting, by the group of broadcast cells, the alert, wherein broadcasting, by the group of broadcast cells, the alert comprises broadcasting, by the group of broadcast cells such that only a portion of one or more of the broadcast cells of the group of broadcast cells broadcast the alert, the group of broadcast cells broadcasting the alert to substantially all of the alert area of the wireless communication network.

10. The system of claim 9, wherein the one or more of the broadcast cells of the group of broadcast cells comprise one or more directional antennas.

11. The system of claim 9, wherein broadcasting, by the group of broadcast cells, the alert comprises broadcasting, by the group of broadcast cells, geographical coordinates of the alert area.

12. The system of claim 9, wherein periodically provisioning a substantially accurate broadcast coverage area of each broadcast cell of the plurality of broadcast cells comprises periodically provisioning a substantially accurate broadcast coverage area of each broadcast cell of the plurality of broadcast cells at least one of daily, weekly, or monthly.

13. One or more non-transitory computer-readable media storing computer executable instructions that, when executed by one or more processors, cause the one or more processors to perform actions comprising:
estimating a true effective radius based at least in part on a combination of individual effective radii for each broadcast cell of a plurality of broadcast cells and based at least on a policy of an operator of a wireless communication network;
based on the estimating, provisioning a database of the wireless communication network with a substantially accurate broadcast coverage area of each broadcast cell of the plurality of broadcast cells within the wireless communication network based at least in part on one or more of radio type, power of a radio, broadcast radius, or azimuth, wherein provisioning the substantially accurate broadcast coverage area of each broadcast cell of the plurality of broadcast cells comprises periodically provisioning the substantially accurate broadcast coverage area of each broadcast cell of the plurality of broadcast cells;
receiving an alert for broadcasting within an alert area of the wireless communication network, the alert area being within the true effective radius, wherein the substantially accurate broadcast coverage area is provisioned prior to determining the alert area;
based at least in part on provisioned broadcast coverage areas of the plurality of broadcast cells, selecting a group of broadcast cells for broadcasting the alert such that the alert is broadcast over substantially all of the alert area, wherein the group of broadcast cells does not include every broadcast cell that broadcasts within at least a portion of the alert area; and
broadcasting, by the group of broadcast cells, the alert, wherein broadcasting, by the group of broadcast cells, the alert comprises broadcasting, by the group of broadcast cells such that only a portion of one or more of the broadcast cells of the group of broadcast cells broadcast the alert, the group of broadcast cells broadcasting the alert to substantially all of the alert area of the wireless communication network.

14. The one or more non-transitory computer-readable media of claim 13, wherein the one or more of the broadcast cells of the group of broadcast cells comprise one or more directional antennas.

15. The one or more non-transitory computer-readable media of claim 13, wherein broadcasting, by the group of broadcast cells, the alert comprises broadcasting, by the group of broadcast cells, geographical coordinates of the alert area.

* * * * *